(12) United States Patent
Aoyagi et al.

(10) Patent No.: US 9,889,694 B2
(45) Date of Patent: Feb. 13, 2018

(54) SUPPORT FOR THERMAL TRANSFER IMAGE-RECEIVING SHEET, THERMAL TRANSFER IMAGE-RECEIVING SHEET, AND PRODUCING METHOD THEREFOR

(71) Applicant: Dai Nippon Printing Co., Ltd., Tokyo (JP)

(72) Inventors: Makoto Aoyagi, Tokyo (JP); Kano Sakamoto, Tokyo (JP); Katsuyuki Hirano, Tokyo (JP); Munenori Ieshige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/129,475

(22) PCT Filed: Mar. 27, 2015

(86) PCT No.: PCT/JP2015/059713
§ 371 (c)(1),
(2) Date: Sep. 27, 2016

(87) PCT Pub. No.: WO2015/147288
PCT Pub. Date: Oct. 1, 2015

(65) Prior Publication Data
US 2017/0100953 A1      Apr. 13, 2017

(30) Foreign Application Priority Data

Mar. 27, 2014   (JP) .................................. 2014-066655

(51) Int. Cl.
*B41M 5/382*     (2006.01)
*B41M 5/50*      (2006.01)
(Continued)

(52) U.S. Cl.
CPC ............... *B41M 5/508* (2013.01); *B32B 3/26* (2013.01); *B32B 5/18* (2013.01); *B32B 7/02* (2013.01);
(Continued)

(58) Field of Classification Search
CPC ........ B41M 5/382; B41M 5/50; B41M 5/502; B41M 5/508; B41M 2205/02;
(Continued)

(56) References Cited

U.S. PATENT DOCUMENTS 5,856,270 A      1/1999   Muto

FOREIGN PATENT DOCUMENTS

JP    08-034169 A1   2/1996
JP    10-029378 A1   2/1998
(Continued)

OTHER PUBLICATIONS

English translation of International Preliminary Report on Patentability (Chapter I) (Application No. PCT/JP2015/059713) dated Oct. 13, 2016, 5 pages.
(Continued)

*Primary Examiner* — Bruce H Hess
(74) *Attorney, Agent, or Firm* — Burr & Brown, PLLC

(57) ABSTRACT

Provided is a support for a thermal transfer image-receiving sheet, capable of obtaining a thermal transfer image-receiving sheet that has favorable stability against curl and is excellent in the texture of a print surface in the case of print under the environmental conditions of high temperature and high humidity. A support for a thermal transfer image-receiving sheet according to the present invention includes a porous layer composed of a porous film, a first polyolefin resin layer, a substrate layer, and a second polyolefin resin layer that are layered in the order mentioned, in which the first polyolefin resin layer has a density of 0.93 g/cm³ or less;
(Continued)

and the second polyolefin resin layer has a density of more than 0.93 g/cm$^3$.

11 Claims, 1 Drawing Sheet

(51) Int. Cl.
    *B32B 5/18*     (2006.01)
    *B32B 27/32*     (2006.01)
    *B32B 7/02*     (2006.01)
    *B32B 3/26*     (2006.01)
    *B32B 27/08*     (2006.01)
    *B32B 37/15*     (2006.01)

(52) U.S. Cl.
    CPC .............. *B32B 27/08* (2013.01); *B32B 27/32* (2013.01); *B32B 37/153* (2013.01); *B41M 5/382* (2013.01); *B41M 5/504* (2013.01); *B41M 5/506* (2013.01); *B32B 2250/04* (2013.01); *B32B 2255/10* (2013.01); *B32B 2307/72* (2013.01); *B32B 2323/04* (2013.01); *B41M 2205/02* (2013.01); *B41M 2205/32* (2013.01); *B41M 2205/34* (2013.01); *B41M 2205/36* (2013.01); *B41M 2205/38* (2013.01)

(58) Field of Classification Search
    CPC . B41M 2205/30; B41M 2205/32; B32B 5/18; B32B 27/32; B32B 2307/72
    USPC .......................................... 503/227; 428/218
    See application file for complete search history.

(56) References Cited

FOREIGN PATENT DOCUMENTS

| | | |
|---|---|---|
| JP | 2008-296485 A1 | 12/2008 |
| JP | 2009-061733 A1 | 3/2009 |

OTHER PUBLICATIONS

International Search Report and Written Opinion (Application No. PCT/JP2015/059713) dated May 19, 2015.

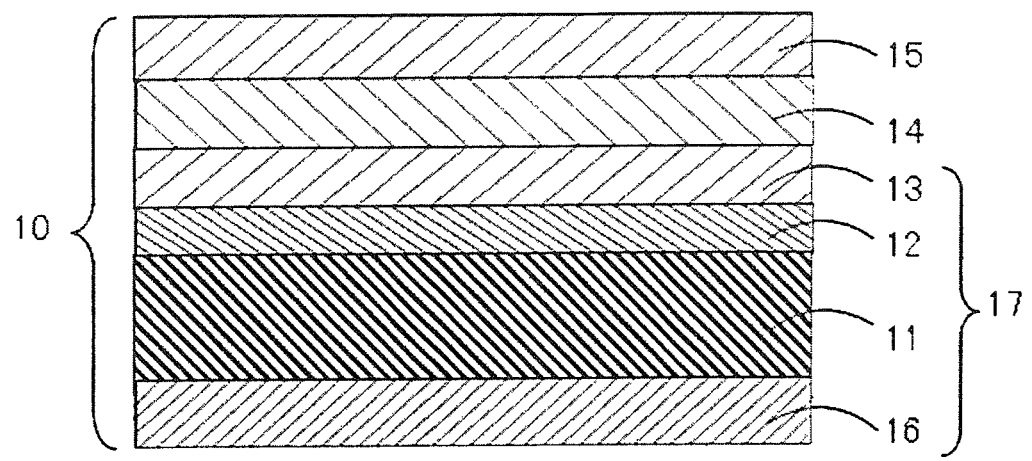

US 9,889,694 B2

SUPPORT FOR THERMAL TRANSFER IMAGE-RECEIVING SHEET, THERMAL TRANSFER IMAGE-RECEIVING SHEET, AND PRODUCING METHOD THEREFOR

TECHNICAL FIELD

The present invention relates to a support for a thermal transfer image-receiving sheet. More particularly, the present invention relates to a support for a thermal transfer image-receiving sheet, comprising a porous layer, a first polyolefin resin layer, a substrate layer, and a second polyolefin resin layer that are layered in the order mentioned. Further, the present invention relates to a thermal transfer image-receiving sheet obtained by layering a color material-receiving layer on a porous layer of the support for a thermal transfer image-receiving sheet. In addition, the present invention relates to a method for producing a support for a thermal transfer image-receiving sheet and a thermal transfer image-receiving sheet.

BACKGROUND ART

Conventionally, a thermosensitive sublimation type transfer system and a thermosensitive melting type transfer system have been widely used among various thermal transfer recording systems. Among them, the thermosensitive sublimation type transfer system is a system in which a sublimation dye is used as a color material, and the dye in a sublimation dye layer formed on a thermal transfer ink sheet is transferred to a thermal transfer image-receiving sheet using a heating device such as a thermal head of which the heat generation is controlled depending on image information, thereby forming an image.

According to the thermosensitive sublimation type transfer system, the amount of transferred dye can be controlled in dot units by heating in a very short time. Because the color material is a dye, transparency is excellent, and a formed image is very clear and is excellent in halftone reproducibility and tone. Therefore, a very-high-definition image is obtained, and a high-quality image equivalent to full-color silver halide photography can be obtained.

As a thermal transfer image-receiving sheet for sublimation transfer (hereinafter referred to as thermal transfer image-receiving sheet) used in such a thermosensitive sublimation type transfer system, a thermal transfer image-receiving sheet in which a color material-receiving layer is formed on a substrate layer is commonly used. Not only high printing sensitivity but also stability against the curl of the image-receiving sheet in itself (curl resistance) is significant as performance demanded for the image-receiving sheet. Therefore, particularly in the case of producing an image-receiving sheet in sheet form, a method of preventing curl using the image-receiving sheet in which plastic sheets and the like are further symmetrically layered on both sides of a support such as a plastic sheet or paper, a method of disposing a curl prevention layer formed of resin or the like on the back side or the like of the image-receiving sheet to keep stability against curl, and the like have been adopted. As such a curl prevention measure, for example, disposition of a back side resin layer on the back side of the support of a thermal transfer image-receiving sheet has been proposed (see Patent Literature 1).

CITATION LIST

Patent Literature

[Patent Literature 1] Japanese Patent Laid-Open Publication No. 10-29378

[Patent Literature 2] Japanese Patent Laid-Open Publication No. 2009-61733

SUMMARY OF INVENTION

Technical Problem

In order to obtain a thermal transfer image-receiving sheet that has smoothness, quality, feeling, and the like equivalent to photographic paper achieving reproduction of full-color silver halide photography and is excellent in the texture of a print surface, a thermal transfer image-receiving sheet obtained by layering a porous film on at least one side of a substrate sheet and by further disposing a dye-receiving layer on the porous film has been proposed (see Patent Literature 2). It is described that the thermal transfer image-receiving sheet, in which polyolefin resin layers are disposed on both sides of a core material comprising non-coat paper in the substrate sheet and one polyolefin resin layer and a dye-receiving layer are laminated by an adhesive layer, has excellent texture. However, the present inventors found that the thermal transfer image-receiving sheet according to Patent Literature 2 has insufficient texture and the texture of a print surface is deteriorated by laminating the polyolefin resin layer and the dye-receiving layer by an adhesive.

The present invention was made under the background technologies described above with an object to provide a support for a thermal transfer image-receiving sheet, capable of obtaining a thermal transfer image-receiving sheet that has favorable stability against curl and is excellent in the texture of a print surface in the case of print under the environmental conditions of high temperature and high humidity.

Solution to Problem

As a result of performing intensive examination in order to solve the above-described problems, the present inventors found that in a thermal transfer image-receiving sheet comprising a porous layer, a first polyolefin resin layer, a substrate layer, and a second polyolefin resin layer that are layered in the order mentioned, the above-described problems can be solved by regulating the densities of the first polyolefin resin layer and the second polyolefin resin layer, whereby the present invention was accomplished.

In other words, according to one aspect of the present invention, there is provided a support for a thermal transfer image-receiving sheet, comprising a porous layer composed of a porous film; a first polyolefin resin layer; a substrate layer; and a second polyolefin resin layer, that are layered in the order mentioned, wherein the first polyolefin resin layer has a density of 0.93 g/cm$^3$ or less; and the second polyolefin resin layer has a density of more than 0.93 g/cm$^3$.

In the aspect of the present invention, the thickness of the second polyolefin resin layer is preferably 1 time or more and 5 times or less the thickness of the first polyolefin resin layer.

In the aspect of the invention, the first polyolefin resin layer and/or the second polyolefin resin layer are preferably polyethylene.

According to another aspect of the present invention, there is provided a thermal transfer image-receiving sheet obtained by further layering a color material-receiving layer on the porous layer of the above-described support for a thermal transfer image-receiving sheet.

According to another aspect of the present invention, there is provided a method for producing a support for a thermal transfer image-receiving sheet, comprising the steps of:

extruding a second polyolefin resin having a density of more than 0.93 g/cm³ to form a second polyolefin resin layer on one side of a substrate layer by an extrusion lamination method; and laminating a porous layer composed of a porous film and the substrate layer by a first polyolefin resin layer formed by extruding a first polyolefin resin having a density of 0.93 g/cm³ or less on the side of the substrate layer opposite to the second polyolefin resin layer by an extrusion lamination method.

According to another aspect of the present invention, there is provided a method for producing a support for a thermal transfer image-receiving sheet, comprising the steps of:

laminating a porous layer composed of a porous film and a substrate layer by a first polyolefin resin layer formed by extruding a first polyolefin resin having a density of 0.93 g/cm³ or less on one side of the substrate layer by an extrusion lamination method; and extruding a second polyolefin resin having a density of more than 0.93 g/cm³ to form a second polyolefin resin layer on the side of the substrate layer opposite to the first polyolefin resin layer by an extrusion lamination method.

According to another aspect of the present invention, there is provided a method for producing a thermal transfer image-receiving sheet, further comprising the step of:

layering a color material-receiving layer on the porous layer prior to the step of laminating the porous layer and the substrate layer in the above-described method for producing a support for a thermal transfer image-receiving sheet.

Advantageous Effects of Invention

According to the present invention, there can be provided a support for a thermal transfer image-receiving sheet, capable of obtaining a thermal transfer image-receiving sheet that has favorable stability against curl and is excellent in the texture of a print surface in the case of print under the environmental conditions of high temperature and high humidity. In addition, according to the present invention, there can be provided a method for producing such a support for a thermal transfer image-receiving sheet.

BRIEF DESCRIPTION OF DRAWINGS

FIG. 1 is a schematic cross-sectional view illustrating one example of a support for a thermal transfer image-receiving sheet and a thermal transfer image-receiving sheet according to the present invention.

MODE FOR CARRYING OUT INVENTION

<Support for Thermal Transfer Image-Receiving Sheet>

A support for a thermal transfer image-receiving sheet according to the present invention comprises a porous layer, a first polyolefin resin layer, a substrate layer, and a second polyolefin resin layer that are layered in the order mentioned. In the support for a thermal transfer image-receiving sheet according to the present invention, a primer layer and a color material-receiving layer may be further layered on the porous layer. For example, it is preferable that an adhesive layer produced by a dry lamination method or a wet lamination method using an adhesive containing polyurethane is prevented from being included between the porous and substrate layers and between the porous layer and the first polyolefin resin layer. The texture of a print surface can be improved by preventing such an adhesive layer from being included between the porous and substrate layers.

One embodiment of the support for a thermal transfer image-receiving sheet according to the present invention will be described with reference to the schematic cross-sectional view. The support 17 for a thermal transfer image-receiving sheet illustrated in FIG. 1 comprises a substrate layer 11, a first polyolefin resin layer 12 on one side of the substrate layer 11, and a porous layer 13 that are layered in the order mentioned. In addition, a second polyolefin resin layer 16 is layered on the other side of the substrate layer 11. Each layer included in the support for a thermal transfer image-receiving sheet according to the present invention will be described in detail below.

(Substrate Layer)

Heat is applied to the substrate layer of the support for a thermal transfer image-receiving sheet according to the present invention during thermal transfer. Therefore, it is preferable to use a material having mechanical strength of which the degree does not constitute a hindrance to handling of the substrate layer even in the state of heating the substrate layer. It is preferable to use a paper substrate as such a material of the substrate layer. It is preferable to use non-coat paper as the paper substrate, and examples thereof include base paper, photographic base paper, and premium grade paper. In the present invention, base paper, photographic base paper, premium grade paper, and the like can be used. In the present invention in which premium grade paper or art paper having a basis weight of, for example, 78 g/m² or more and 400 g/m² or less, preferably 100 g/m² or more and 200 g/m² or less, can be used, non-coat paper or coat paper can be used as the substrate layer.

The thickness of the substrate layer is not particularly limited, and is preferably 50 μm or more and 300 μm or less, more preferably 100 μm or more and 250 μm or less, and still more preferably 150 μm or more and 175 μm or less. Stability against the curl of a print can be improved and the texture of a print surface can be improved in the case of print under the environmental conditions of high temperature and high humidity as long as the thickness of the substrate layer is within the range described above.

(Polyolefin Resin Layer)

The first polyolefin resin layer of the support for a thermal transfer image-receiving sheet according to the present invention is formed on one side (color material-receiving layer side) of the substrate layer, while the second polyolefin resin layer is formed on the other side (back side) of the substrate layer.

The first polyolefin resin layer can be formed of a first polyolefin resin having a density of 0.93 g/cm³ or less, preferably 0.90 g/cm³ or more and 0.93 g/cm³ or less, and more preferably 0.915 g/cm³ or more and 0.925 g/cm³ or less. The second polyolefin resin layer can be formed of a second polyolefin resin having a density of more than 0.93 g/cm³, preferably 0.94 g/cm³ or more and 0.975 g/cm³ or less, and more preferably 0.945 g/cm³ or more and 0.96 g/cm³ or less. Stability against the curl of a print can be improved and the texture of a print surface can be improved in the case of print under the environmental conditions of high temperature and high humidity by regulating the densities of the first polyolefin resin layer and the second polyolefin resin layer to the ranges described above. The above-described polyolefin densities are values measured according to JIS K 6760.

The thickness of the second polyolefin resin layer is preferably 1 time or more and 5 times or less, more preferably 1.2 times or more and 3 times or less, and still more preferably 1.5 times or more and 2.5 times or less the thickness of the first polyolefin resin layer. Stability against the curl of a print can be improved and the texture of a print surface can be improved in the case of print under the environmental conditions of high temperature and high humidity by regulating the ratio between the thicknesses of the first polyolefin resin layer and the second polyolefin resin layer to the range described above.

The thickness of the first polyolefin resin layer is preferably 5 μm or more and 30 μm or less, more preferably 10 μm or more and 25 μm or less, and still more preferably 12 μm or more and 20 μm or less. The thickness of the second polyolefin resin layer is preferably 15 μm or more and 50 μm or less, more preferably 20 μm or more and 40 μm or less, and still more preferably 25 μm or more and 35 μm or less. Stability against the curl of a print can be improved and the texture of a print surface can be improved in the case of print under the environmental conditions of high temperature and high humidity by regulating the thicknesses of the first polyolefin resin layer and the second polyolefin resin layer to the ranges described above.

The first polyolefin resin layer and/or the second polyolefin resin layer preferably use a resin such as polyethylene, polypropylene, or a propylene-ethylene copolymer, and particularly preferably contain a polyethylene resin as a main component. The main component means that the polyethylene resin is contained in 50 mass % or more of the solid content of the polyolefin resin layer. One or a mixture of two or more of resins such as low density polyethylene, linear low density polyethylene, medium density polyethylene, and high density polyethylene may be used as the polyethylene resin.

Low density polyethylene is also referred to as high-pressure low-density polyethylene or soft polyethylene, is an ethylene homopolymer or a copolymer of ethylene and α-olefin, and has a structure in which ethylene as a repeating unit is randomly branched. The density of low density polyethylene is typically around 0.900 $g/cm^3$ or more and 0.930 $g/cm^3$ or less. High density polyethylene is an ethylene homopolymer or a copolymer of ethylene and α-olefin, which is also referred to as medium-low pressure polyethylene or rigid polyethylene, and may have a structure in which ethylene as a repeating unit is hardly branched. The density of high density polyethylene is typically around 0.940 $g/cm^3$ or more and 0.975 $g/cm^3$ or less. For example, use of low density polyethylene as the first polyolefin resin and a mixture of high density polyethylene and low density polyethylene as the second polyolefin resin enables regulation to the numerical ranges of the densities described above. As the second polyolefin resin, the mixture can be used in which the ratio of the mass of the high density polyethylene to the total mass of the low density polyethylene and the high density polyethylene is preferably 0.3 or more and less than 1.0, more preferably 0.5 or more and 0.9 or less, and still more preferably 0.6 or more and 0.8 or less.

(Porous Layer)

The porous layer of the support for a thermal transfer image-receiving sheet according to the present invention is composed of a porous film. The thickness of the porous film is preferably 10 μm or more and 100 μm or less, more preferably 15 μm or more and 80 μm or less, and still more preferably 20 μm or more and 50 μm or less. The porous film preferably has a density of 0.1 $g/cm^3$ or more and 1.5 $g/cm^3$ or less, more preferably 0.3 $g/cm^3$ or more and 1.0 $g/cm^3$ or less, and still more preferably 0.5 $g/cm^3$ or more and 0.8 $g/cm^3$ or less, measured according to JIS K6922. The porous film is preferably a porous film which contains a polyolefin resin, for example, polypropylene resin or polyethylene terephthalate resin, as a resin as a base, and of which the interior contains fine voids. Stability against the curl of a print can be improved and the texture of a print surface can be improved in the case of print under the environmental conditions of high temperature and high humidity by disposing the porous layer composed of the porous film having a thickness in a range equivalent to the above-described range and containing polypropylene resin.

In a method of generating the fine voids in the film, a compound is produced by kneading organic fine particles or inorganic fine particles (of which the kinds may be one or more) immiscible with the resin as the base of the film. Microscopic observation of the compound reveals that the resin as the base and fine particles immiscible with the resin as the base form a fine sea-island structure. The compound is made into a film, which is stretched, whereby a sea-island interface is peeled or an area in which an island is formed is greatly deformed, thereby generating such fine voids as described above.

Examples of the method of forming the fine voids include a method of adding polyester or acrylic resin of which the melting is higher than that of polypropylene to polypropylene as a base. In this case, the polyester or the acrylic resin serves as a nucleating agent for forming fine voids. In any case, the content of the polyester or the acrylic resin is preferably 2 parts by mass or more and 10 parts by mass or less with respect to 100 parts by mass of polypropylene. When the content is 2 parts by mass or more, the fine voids can be sufficiently generated, and printing sensitivity can be further improved. When the content is 10 parts by mass or less, the heat resistance of the porous film can be sufficiently secured.

It is preferable to further add polyisoprene in order to generate more voids that are fine and minute when the porous film in which the resin as the base is polypropylene is formed. As a result, higher printing sensitivity can be obtained. For example, a compound is produced by blending acrylic resin or polyester, and polyisoprene with polypropylene as a base and is made into a film, which is stretched, whereby the porous film having high printing sensitivity can be obtained.

<Thermal Transfer Image-Receiving Sheet>

A thermal transfer image-receiving sheet according to the present invention comprises a color material-receiving layer that is further layered on the porous layer of the support for a thermal transfer image-receiving sheet described above. Use of the support for a thermal transfer image-receiving sheet described above can result in the thermal transfer image-receiving sheet that has favorable stability against curl and is excellent in the texture of a print surface in the case of print under the environmental conditions of high temperature and high humidity.

One embodiment of the thermal transfer image-receiving sheet according to the present invention will be described with reference to the schematic cross-sectional view. The thermal transfer image-receiving sheet 10 illustrated in FIG. 1 comprises a primer layer 14 and a color material-receiving layer 15 that are layered, in the order mentioned, on the porous layer 13 of the support 17 for a thermal transfer image-receiving sheet. Each layer included in the thermal transfer image-receiving sheet according to the present invention will be described in detail below.

(Color Material-Receiving Layer)

The color material-receiving layer of the thermal transfer image-receiving sheet according to the present invention is intended to receive a sublimating dye shifting from a thermal transfer ink sheet and to maintain a formed image. Examples of resins for forming the color material-receiving layer include polycarbonate resins, polyester resins, polyamide resins, acrylic resins, cellulosic resins, polysulfone resins, polyvinyl chloride resin, polyvinyl acetate resin, vinyl chloride-vinyl acetate copolymer resin, polyvinyl acetal resin, polyvinyl butyral resin, polyurethane resins, polystyrene resins, polypropylene resins, polyethylene resins, ethylene-vinyl acetate copolymer resin, and epoxy resin.

In the thermal transfer image-receiving sheet according to the present invention, a mold release agent can be contained in the color material-receiving layer in order to improve releasability from the thermal transfer ink sheet. Examples of the mold release agent include: solid waxes such as polyethylene wax, amide wax, and Teflon (registered trademark) powder; fluorine- or phosphate ester-based surfactants; various modified silicone oils such as silicone oils, reactive silicone oils, and curable silicone oils; and various silicone resins. Such a silicone oil is preferred as the mold release agent. As the silicone oils described above, oily silicone oils can be used, and modified silicone oils are preferred. As the modified silicone oils, amino-modified silicone, epoxy-modified silicone, aralkyl-modified silicone, epoxy-aralkyl-modified silicone, alcohol-modified silicone, vinyl-modified silicone, urethane-modified silicone, and the like can be preferably used, and epoxy-modified silicone, aralkyl-modified silicone, and epoxy-aralkyl-modified silicone are particularly preferred. It is also preferable to use the mold release agents in combination of two or more kinds thereof. It is preferable that the amount of each of the added modified silicone oils is 0.5 mass % or more and 30 mass % or less of the resin included in the color material-receiving layer.

When the color material-receiving layer is formed, pigments and fillers, such as titanium oxide, zinc oxide, kaoline, clay, calcium carbonate, and fine powder silica, can be added for the purpose of improving the whiteness of the color material-receiving layer to further enhance the sharpness of a transferred image. Plasticizers such as phthalic acid ester compounds, sebacic acid ester compounds, and phosphoric acid ester compounds may be added.

(Mold Release Layer)

The thermal transfer image-receiving sheet according to the present invention may further comprise a mold release layer on at least a part of a surface of the color material-receiving layer. The mold release layer can be formed by dissolving or dispersing the mold release agent described above in an appropriate solvent, and applying and drying the resultant. The mold release agent used for the mold release layer is not particularly limited but is preferably a cured reaction product of amino-modified silicone oil and epoxy-modified silicone oil. The thickness of the mold release agent layer is preferably 0.01 µm or more and 5.0 µm or less, and more preferably 0.05 µm or more and 2.0 µm or less. In the case of forming the color material-receiving layer, addition of silicone oil to form the color material-receiving layer enables the mold release layer to be formed even in the case of curing the silicone oil bleeding out on the surface after the application. When the color material-receiving layer is formed, pigments and fillers, such as titanium oxide, zinc oxide, kaoline, clay, calcium carbonate, and fine powder silica, can be added for the purpose of improving the whiteness of the color material-receiving layer to further enhance the sharpness of a transferred image. Plasticizers such as phthalic acid ester compounds, sebacic acid ester compounds, and phosphoric acid ester compounds may be added.

(Primer Layer)

The primer layer of the thermal transfer image-receiving sheet according to the present invention is disposed between the color material-receiving layer and the porous layer and is directed to impart adhesiveness between the color material-receiving layer and the porous film, whiteness, cushioning properties, a concealment ability, antistatic properties, curl prevention properties, and the like. In the present invention, any conventionally known primer layer can be disposed. Examples of a binder resin used for the primer layer include polyurethane resins, polyester resins, polycarbonate resins, polyamide resins, acrylic resins, polystyrene resins, polysulfone resins, polyvinyl chloride resins, polyvinyl acetate resins, vinyl chloride-vinyl acetate copolymer resin, polyvinyl acetal resin, polyvinyl butyral resin, polyvinyl alcohol resin, epoxy resin, cellulosic resins, ethylene-vinyl acetate copolymer resin, polyethylene resins, and polypropylene resins. Of these resins, cured isocyanate products of the resins having an active hydroxyl group can be further used as binders.

It is preferable to add a filler such as titanium oxide, zinc oxide, magnesium carbonate, or calcium carbonate in order to impart whiteness and a concealment ability. Further, a stilbene compound, a benzimidazole compound, a benzoxazole compound, or the like can be added as a fluorescent whitening agent in order to enhance whiteness, a hindered amine compound, a hindered phenol compound, a benzotriazole compound, a benzophenone compound, or the like can be added as an ultraviolet absorbing agent or an antioxidant in order to enhance the light resistance of a print, or cationic acrylic resin, polyaniline resin, various conductive fillers, or the like can be added in order to impart antistatic properties. It is preferable that the amount of the applied primer layer is around 0.5 g/m$^2$ or more and 5 g/m$^2$ or less in a dry state.

<Method for Producing Support for Thermal Transfer Image-Receiving Sheet>

The support for a thermal transfer image-receiving sheet according to the present invention can be produced by layering a porous layer, a first polyolefin resin layer, a substrate layer, and a second polyolefin resin layer by a known method. For example, the support for a thermal transfer image-receiving sheet can be obtained by extruding a second polyolefin resin to form the second polyolefin resin layer on one side of the substrate layer by an extrusion lamination method, and subsequently laminating the porous layer and the substrate layer by the first polyolefin resin layer formed by extruding a first polyolefin resin on the side of the substrate layer opposite to the second polyolefin resin layer by an extrusion lamination method (also referred to as "sand lamination method"). The support for a thermal transfer image-receiving sheet can also be obtained by laminating the porous layer and the substrate layer by the first polyolefin resin layer formed by extruding a first polyolefin resin on one side of the substrate layer by an extrusion lamination method (also referred to as "sand lamination method"), and subsequently extruding a second polyolefin resin to form the second polyolefin resin layer on the side of the substrate layer opposite to the first polyolefin resin layer by an extrusion lamination method. The support for a thermal transfer image-receiving sheet can be obtained by layering by a method including such an extrusion lamination method (also referred to as "sand lamination method") even unless forming such an adhesive layer as formed between the porous layer and the substrate layer by a dry lamination process.

<Method for Producing Thermal Transfer Image-Receiving Sheet>

The thermal transfer image-receiving sheet according to the present invention can be produced by layering a color material-receiving layer on the porous layer of the support for a thermal transfer image-receiving sheet described above by a known method. The thermal transfer image-receiving sheet according to the present invention can be produced by layering a color material-receiving layer on the porous layer prior to the lamination of the porous layer composed of the porous film and the substrate layer in the method for producing a support for a thermal transfer image-receiving sheet described above. Specifically, a thermal transfer image-receiving sheet can be produced by extruding a second polyolefin resin to form the second polyolefin resin layer on one side of the substrate layer by an extrusion lamination method, and subsequently laminating the porous layer, on which the color material-receiving layer is layered by the known method, and the substrate layer by a first polyolefin resin formed on the side of the substrate layer opposite to the second polyolefin resin layer by an extrusion lamination method (also referred to as "sand lamination method"). Alternatively, the thermal transfer image-receiving sheet can also be produced by laminating the porous layer, on which the color material-receiving layer is layered by the known method, and the substrate layer by a first polyolefin resin layer formed on one side of the substrate layer by an extrusion lamination method (also referred to as "sand lamination method"), and subsequently extruding a second polyolefin resin to form the second polyolefin resin layer on the side the substrate layer opposite to the first polyolefin resin layer by an extrusion lamination method.

The color material-receiving layer may be layered on the support for a thermal transfer image-receiving sheet optionally before or after the lamination of the substrate layer and the porous layer.

For example, the color material-receiving layer can be formed by applying and drying a coating liquid, obtained by dissolving or dispersing a thermoplastic resin and another needed additive, for example, a mold release agent, a plasticizer, a filler, a crosslinking agent, a curing agent, a catalyst, a heat mold release agent, an ultraviolet absorbing agent, an antioxidant, a light stabilizer, or the like in an organic solvent or water, by formation means such as, for example, a gravure printing method, a screen printing method, or a reverse roll coating method using a photogravure. The amount of the applied color material-receiving layer formed in such a manner is typically around 0.5 g/m² or more and 50 g/m² or less and preferably 2 g/m² or more and 10 g/m² or less in a dry state. Such a color material-receiving layer is preferably formed by continuous coating or may be formed by discontinuous coating. The primer layer and the like may also be applied by a method similar to the means for forming the color material-receiving layer. The primer layer and the like may also be layered on the support for a thermal transfer image-receiving sheet optionally before or after the lamination of the substrate layer and the porous layer.

<Thermal Transfer Ink Sheet>

It is preferable that the thermal transfer ink sheet used together with the thermal transfer image-receiving sheet according to the present invention has a layer configuration in which a thermal transfer color material layer is disposed on one side of the substrate sheet and a heat-resistant slipping layer is disposed on the other side of the substrate sheet. Each layer included in the thermal transfer ink sheet will be described below.

(Substrate Sheet)

As the material of the substrate sheet included in the thermal transfer ink sheet used in the present invention, a conventionally known material can be used, or otherwise a material having certain heat resistance and strength can be used. Examples thereof include resin films such as polyethylene terephthalate, polyester, polypropylene, polycarbonate, polyethylene, polystyrene, polyvinyl alcohol, polyvinyl chloride, polyvinylidene chloride, polyimide, nylon, cellulose acetate, and ionomer; papers such as condenser paper and paraffin paper; and non-woven fabrics. They may be used singly or a layered product in which they are optionally combined may be used. Of these, polyethylene terephthalate which is a general-purpose plastic that can be thinned and is inexpensive is preferable.

The thickness of the substrate sheet can be selected as appropriate depending on a material so that strength, heat resistance, and the like are appropriate. Typically, the thickness is preferably around 0.5 μm or more and 50 μm or less, more preferably 1 μm or more and 20 μm or less, and still more preferably 1 μm or more and 10 μm or less.

The substrate sheet may be subjected to surface treatment in order to improve adhesiveness with an adjacent layer. A known resin surface modification technology such as corona discharge treatment, flame treatment, ozone treatment, ultraviolet treatment, radiation treatment, roughening treatment, chemical treatment, plasma treatment, or grafting treatment can be used as the surface treatment described above. Only one kind or two or more kinds of the surface treatments described above may be performed.

Further, it is also possible to form an adhesive layer by application on the substrate sheet in adhesion treatment of the substrate sheet described above. The adhesive layer can be formed of, for example, the following organic materials and inorganic materials. Examples of the organic materials described above include vinyl resins such as polyester resins, polyacrylic acid ester resins, polyvinyl acetate resins, polyurethane resins, styrene acrylate resins, polyacrylamide resins, polyamide resins, polyether resins, polystyrene resins, polyethylene resins, polypropylene resins, polyvinyl chloride resin, polyvinyl alcohol resin, polyvinylpyrrolidone, and modified products thereof; and polyvinyl acetal resins such as polyvinyl acetoacetal and polyvinyl butyral. Examples of the inorganic materials described above include colloidal inorganic pigment ultrafine particles such as silica (colloidal silica), alumina or hydrated alumina (alumina sol, colloidal alumina, cationic aluminum oxide or hydrates thereof, pseudoboehmite, and the like), aluminum silicate, magnesium silicate, magnesium carbonate, magnesium oxide, and titanium oxide.

When a plastic film is produced by being subjected to stretching treatment as the surface treatment described above, the production can also be performed by applying a primer liquid to an unstretched film and then performing stretching treatment (primer treatment).

(Thermal Transfer Color Material Layer)

In the thermal transfer ink sheet used in the present invention, the thermal transfer color material layer is disposed on one side of the substrate sheet. A layer containing a sublimation dye is formed as the thermal transfer color material layer when the thermal transfer ink sheet is a sublimation thermal transfer ink sheet, while a layer containing a thermal melting ink composed of a thermal melting composition containing a coloring agent is formed when the thermal transfer ink sheet is a thermal melting thermal transfer ink sheet. A layer region containing a sublimation dye and a layer region containing a thermal melting ink composed of a thermal melting composition containing a coloring agent may be plane-sequentially disposed on one continuous substrate sheet.

As the material of the thermal transfer color material layer, a conventionally known dye can be used, and a material that has properties favorable as a print material, for example, has sufficient coloring concentration and is prevented from being discolored due to light, heat, temperature, and the like is preferable. Examples thereof include diarylmethane dyes, triarylmethane dyes, thiazole dyes, merocyanine dyes, pyrazolone dyes, methine dyes, indoaniline dyes, azomethine dyes such as acetophenoneazomethine, pyrazoloazomethine, imidazoleazomethine, imidazoazomethine, and pyridoneazomethine, xanthene dyes, oxazine dyes, cyanostyrene dyes such as dicyanostyrene and tricyanostyrene, thiazine dyes, azine dyes, acridine dyes, benzene azo dyes, azo dyes such as pyridone azo, thiophene azo, isothiazole azo, pyrrole azo, pyrazole azo, imidazole azo, thiadiazole azo, triazole azo, and disazo, spiropyran dyes, indolinospiropyran dyes, fluorane dyes, rhodamine lactam dyes, naphthoquinone dyes, anthraquinone dyes, and quinophthalone dyes. Specific examples thereof include red dyes such as Disperse Red 60, Disperse Violet 26,Ceres Red 7B, and Samaron Red F3BS, yellow dyes such as Disperse Yellow 231, PTY-52, and Macrolex Yellow 6G, and blue dyes such as Solvent Blue 63, Waxoline Blue AP-FW, Holon Brilliant Blue S-R, MS Blue 100, and C.I. Solvent Blue 22. In addition, a dye contained in a commercially available ribbon used in a sublimation thermal transfer system can also be used.

Examples of binder resins for supporting the dyes described above include cellulosic resins such as ethylcellulose resin, hydroxyethyl cellulose resin, ethyl hydroxy cellulose resin, methyl cellulose resin, and cellulose acetate resin, vinyl resins such as polyvinyl alcohol resin, polyvinyl acetate resin, polyvinyl butyral resin, polyvinyl acetal resin, and polyvinylpyrrolidone, acrylic resins such as poly(meth)acrylate and poly(meth)acrylamide, polyurethane resins, polyamide resins, and polyester resins. Of these, resins such as cellulosic resins, vinyl resins, acrylic resins, polyurethane resins, and polyester resins are preferred in view of heat resistance and the transferability of a dye.

Examples of a method for forming a thermal transfer color material layer include the following method. The thermal transfer color material layer can be formed by optionally adding an additive such as a mold release agent to the dye and binder resin described above, dissolving the resultant in an appropriate organic solvent such as toluene or methyl ethyl ketone or dispersing the resultant in water, and applying and drying the obtained application liquid for a thermal transfer color material layer (solution or dispersion liquid) to one side of the substrate sheet by formation means such as, for example, a gravure printing method, a reverse roll coating method using a photogravure, a roll coater, or a bar coater. It is preferable that the thickness of the thermal transfer color material layer is around 0.2 µm or more and 5.0 µm or less, and the content of the sublimation dye in the thermal transfer color material layer is 5 mass % or more and 90 mass % or less, preferably 5 mass % or more and 70 mass % or less.

(Protecting Layer)

In the thermal transfer ink sheet used in the present invention, a protecting layer may be plane-sequentially disposed on the same plane as that of the thermal transfer color material layer. A color material is transferred to the thermal transfer image-receiving sheet, and the protecting layer is then transferred to perform coating of an image, whereby the image can be protected from light, gas, liquid, a scratch, and the like. It is also acceptable that another layer such as an adhesive layer, a peeling layer, or an undercoating layer is disposed as the protecting layer.

(Heat-Resistant Slipping Layer)

The heat-resistant slipping layer primarily comprises a heat-resistant resin. Examples of the heat-resistant resin include, but are not particularly limited to, polyvinyl butyral resin, polyvinyl acetoacetal resin, polyester resin, vinyl chloride-vinyl acetate copolymer resin, polyether resin, polybutadiene resin, styrene-butadiene copolymer resin, acrylic polyol, polyurethane acrylate, polyester acrylate, polyether acrylate, epoxy acrylate, a urethane or epoxy prepolymer, nitrocellulose resin, cellulose nitrate resin, cellulose acetate propionate resin, cellulose acetate butyrate resin, cellulose acetate-hydrodiene phthalate resin, cellulose acetate resin, aromatic polyamide resin, polyimide resin, polyamide-imide resin, polycarbonate resin, and chlorinated polyolefin resin.

The heat-resistant slipping layer may be formed by being blended with an additive such as an agent for imparting lubricity, a crosslinking agent, a mold release agent, an organic powder, or an inorganic powder as well as the above heat-resistant resin described above.

The heat-resistant slipping layer can also be commonly formed by adding the above-described heat-resistant resin as well as the above-described agent for imparting lubricity and additive added as desired into a solvent, dissolving or dispersing each component to prepare a heat-resistant slipping layer application liquid, and then applying and drying the heat-resistant slipping layer application liquid onto a substrate. A solvent similar to the solvent in the above-described dye ink can be used as the solvent in the above-described heat-resistant slipping layer application liquid.

Examples of a method of applying a heat-resistant slipping layer application liquid include wire bar coating, gravure printing method, screen printing method, and reverse roll coating method using a photogravure. Especially, gravure coating is preferable. The heat-resistant slipping layer application liquid is preferably applied so as to have a dry application amount of preferably 0.1 $g/m^2$ or more and 3 $g/m^2$ or less, and more preferably 1.5 $g/m^2$ or less.

<Image Formation Method>

In an image formation method using the thermal transfer image-receiving sheet according to the present invention, an image can be formed by transferring a thermally diffusive coloring matter contained in a thermal transfer ink sheet to the thermal transfer image-receiving sheet by overlapping the thermal transfer image-receiving sheet and the thermal transfer ink sheet containing the thermally diffusive coloring matter and heating them depending on a recorded signal. In the present invention, an image can also be formed by high-speed printing. The high-speed printing is performed at 0.5 msec/line or more and 3.0 msec/line or less.

Kno2wn thermal transfer recording apparatuses can be used in such an image formation method, without particular limitation. In the present invention, a commercially available thermal transfer recording apparatus can be used, and examples thereof include a sublimation thermal transfer printer ((model: MEGAPIXEL III) manufactured by ALTECH ADS Corporation, (model: DS40) manufactured by DNP FOTOLUSIO)).

EXAMPLES

The present invention will be described in more detail below with reference to Examples and Comparative Examples, but the present invention is not intended to be interpreted with limitation to the content of the following Examples.

<Production of Support for Thermal Transfer Image-Receiving Sheet>

Example 1

A porous polypropylene film (thickness of 38 μm, density of 0.7 g/cm$^3$) was prepared as a porous film forming a porous layer. White base paper (non-coat paper, thickness of 150 μm, manufactured by (Mitsubishi Paper Mills Limited)) as a paper substrate was prepared as a substrate layer. Mixed resin of high-density polyethylene resin (density of 0.956 g/cm$^3$) and low-density polyethylene resin (density of 0.919 g/cm$^3$) (mixture ratio of 8:2, density of 0.949 g/cm$^3$) was extruded onto a side of the white base paper by an extrusion lamination method to form a second polyolefin resin layer (thickness 30 μm). Subsequently, the porous polypropylene film and white base paper described above were laminated while extruding the above-described low-density polyethylene resin onto the side of the substrate layer opposite to the second polyolefin resin layer, and a first polyolefin resin layer (thickness of 15 μm) composed of the low-density polyethylene resin was formed between the porous layer and the substrate layers to obtain a support for a thermal transfer image-receiving sheet.

<Production of Thermal Transfer Image-Receiving Sheet>

Subsequently, a coating liquid for a primer layer having the following composition was applied onto the porous polypropylene film by a gravure coater so that the dried liquid was 2 g/m$^2$. The coating liquid was dried at 110° C. for 1 minute and a coating liquid for a color material-receiving layer having the following composition was then applied thereon by the gravure coater so that the dried liquid was 4 g/m$^2$. The coating liquid was dried at 110° C. for 1 minute to form a primer layer and a color material-receiving layer to obtain a thermal transfer image-receiving sheet.

(Composition of Coating Liquid for Primer Layer)
  Polyester resin (trade name: WR-905, manufactured by The Nippon Synthetic Chemical Industry Co., Ltd.) 13.1 parts by mass
  Titanium oxide (trade name: TCA-888, manufactured by TOHKEM PRODUCTS CORPORATION) 26.2 parts by mass
  Fluorescent whitening agent (benzimidazole derivative, trade name: UVITEX BAC, manufactured by Ciba Specialty Chemicals Inc.) 0.39 part by mass
  Water/isopropyl alcohol [IPA] (mass ratio of 2/1) 60 parts by mass (Composition of Coating Liquid for Color Material-Receiving Layer)
  Vinyl chloride-vinyl acetate copolymer (trade name: Solbine C, manufactured by Nissin Chemical Industry Co., Ltd.) 60 parts by mass
  Epoxy-modified silicone (trade name: X-22-3000T, manufactured by Shin-Etsu Chemical Co., Ltd.) 1.2 parts by mass
  Methylstyryl-modified silicone (trade name: 24-510, manufactured by Shin-Etsu Chemical Co., Ltd.) 0.6 part by mass
  Methyl ethyl ketone/toluene (mass ratio of 1/1) 5 parts by mass Example 2

A support for a thermal transfer image-receiving sheet were produced in the same manner as that in Example 1 except that the resin used for the second polyolefin resin layer was changed to the mixed resin of the above-described high-density polyethylene resin and the above-described low-density polyethylene resin (mixture ratio of 3:2, density of 0.941 g/cm$^3$). Subsequently, a thermal transfer image-receiving sheet was produced in the same manner as that in Example 1.

Example 3

A support for a thermal transfer image-receiving sheet was produced in the same manner as that in Example 1 except that the thickness of the first polyolefin resin layer was changed to 20 μm. Subsequently, a thermal transfer image-receiving sheet was produced in the same manner as that in Example 1.

Example 4

A support for a thermal transfer image-receiving sheet was produced in the same manner as that in Example 1 except that the thickness of the second polyolefin resin layer was changed to 15 μm. Subsequently, a thermal transfer image-receiving sheet was produced in the same manner as that in Example 1.

Example 5

A support for a thermal transfer image-receiving sheet was produced in the same manner as that in Example 1 except that the thickness of the first polyolefin resin layer was changed to 10 μm. Subsequently, a thermal transfer image-receiving sheet was produced in the same manner as that in Example 1.

Example 6

A support for a thermal transfer image-receiving sheet was produced in the same manner as that in Example 1 except that the thickness of the first polyolefin resin layer was changed to 7 μm and the thickness of the second polyolefin resin layer was changed to 35 μm. Subsequently, a thermal transfer image-receiving sheet was produced in the same manner as that in Example 1.

Example 7

A porous polypropylene film (thickness of 38 μm, density of 0.7 g/cm$^3$) was prepared as a porous film forming a porous layer. A primer layer and a color material-receiving layer were formed on the porous polypropylene film in the same manner as that in Example 1. Coat paper (thickness of 152 μm, manufactured by DAIO PAPER CORPORATION) as a paper substrate was prepared as a substrate layer. A second polyolefin resin layer (thickness of 30 μm) was formed on a side of the coat paper in the same manner as that in Example 1. Subsequently, the side of the porous polypropylene film described above opposite to the side of the color material-receiving layer and the coat paper were laminated while extruding a low-density polyethylene resin (density of 0.919 g/cm$^3$) onto the side of the substrate layer opposite to the second polyolefin resin layer to form a first polyolefin resin layer (thickness of 15 μm) composed of the low-density polyethylene resin between the porous layer and the substrate layers to produce a thermal transfer image-receiving sheet.

Example 8

A support for a thermal transfer image-receiving sheet was produced in the same manner as that in Example 1 except that prior to the formation of the second polyolefin resin layer and the first polyolefin resin layer, corona treatment of the side of the substrate layer on which each resin layer was formed was performed. Subsequently, a thermal transfer image-receiving sheet was produced in the same manner as that in Example 1.

Example 9

A porous polypropylene film (thickness of 38 μm, density of 0.7 g/cm$^3$) was prepared as a porous film forming a porous layer. White base paper (non-coat paper, thickness of 150 μm, manufactured by (Mitsubishi Paper Mills Limited)) as a paper substrate was prepared as a substrate layer. The porous polypropylene film and white base paper described above were laminated while extruding a low-density polyethylene resin (density of 0.919 g/cm$^3$) onto a side of the white base paper to form a first polyolefin resin layer (thickness of 15 μm) composed of the low-density polyethylene resin between the porous layer and the substrate layers. Subsequently, the mixed resin of a high-density polyethylene resin (density of 0.956 g/cm$^3$) and a low-density polyethylene resin (density of 0.919 g/cm$^3$) (mixture ratio of 8:2, density of 0.949 g/cm$^3$) was extruded on the side of the substrate layer opposite to the first polyolefin resin layer by an extrusion lamination method to form a second polyolefin resin layer (thickness of 30 μm) to obtain a support for a thermal transfer image-receiving sheet. Subsequently, a thermal transfer image-receiving sheet was produced in the same manner as that in Example 1.

Example 10

A thermal transfer image-receiving sheet was produced in the same manner as that in Example 7 except that white base paper (non-coat paper, thickness of 150 μm, manufactured by (Mitsubishi Paper Mills Limited)) as a paper substrate was prepared as a substrate layer.

Comparative Example 1

A support for a thermal transfer image-receiving sheet was produced using an adhesive having the following composition in the same manner as that in Example 1 except that the lamination of the porous polypropylene film and the white base paper to form the first polyolefin resin layer was not performed. Subsequently, a thermal transfer image-receiving sheet was produced in the same manner as that in Example 1.

(Composition of Adhesive)
Oligomer containing hydroxyl group (trade name: TAKE-LAC A-969V, manufactured by Mitsui Chemicals Polyurethanes, Inc.) 45 parts by mass
Urethane oligomer having isocyanate group (trade name: TAKENATE A-51, manufactured by Mitsui Chemicals Polyurethanes, Inc.) 15 parts by mass
Ethyl acetate 40 parts by mass Comparative Example 2

A support for a thermal transfer image-receiving sheet was produced in the same manner as that in Example 1 except that the resin used for the first polyolefin resin layer was changed to the mixed resin of the high-density polyethylene resin and low-density polyethylene resin described above (mixture ratio of 8:2, density of 0.949 g/cm$^3$). Subsequently, a thermal transfer image-receiving sheet was produced in the same manner as that in Example 1.

Comparative Example 3

A support for a thermal transfer image-receiving sheet was produced in the same manner as that in Example 1 except that the resin used for the second polyolefin resin layer was changed to the low-density polyethylene resin described above. Subsequently, a thermal transfer image-receiving sheet was produced in the same manner as that in Example 1.

Comparative Example 4

A support for a thermal transfer image-receiving sheet was produced in the same manner as that in Example 1 except that the resin used for the first polyolefin resin layer was changed to the mixed resin of the above-described high-density polyethylene resin and the above-described low-density polyethylene resin (mixture ratio of 8:2, density of 0.949 g/cm$^3$) and that the resin used for the second polyolefin resin layer was changed to the above-described low-density polyethylene resin (density of 0.919 g/cm$^3$). Subsequently, a thermal transfer image-receiving sheet was produced in the same manner as that in Example 1.

The relationships between the first polyolefin resin layers and the second polyolefin resin layers in the supports for thermal transfer image-receiving sheets produced in the Examples and Comparative Examples described above are shown in Table 1.

TABLE 1

| | First Polyolefin Resin Layer | | Second Polyolefin Resin Layer | | Thickness of Second Polyolefin Resin Layer with Respect to Thickness of First Polyolefin Resin Layer (Times) |
|---|---|---|---|---|---|
| | Density (g/cm$^3$) | Thickness (μm) | Density (g/cm$^3$) | Thickness (μm) | |
| Example 1 | 0.919 | 15 | 0.949 | 30 | 2 |
| Example 2 | 0.919 | 15 | 0.941 | 30 | 2 |
| Example 3 | 0.919 | 20 | 0.949 | 30 | 1.5 |
| Example 4 | 0.919 | 15 | 0.949 | 15 | 1 |
| Example 5 | 0.919 | 10 | 0.949 | 30 | 3 |
| Example 6 | 0.919 | 7 | 0.949 | 35 | 5 |
| Example 7 | 0.919 | 15 | 0.949 | 30 | 2 |
| Example 8 | 0.919 | 15 | 0.949 | 30 | 2 |

TABLE 1-continued

|  | First Polyolefin Resin Layer | | Second Polyolefin Resin Layer | | Thickness of Second Polyolefin Resin Layer with Respect to Thickness of First Polyolefin Resin Layer (Times) |
|---|---|---|---|---|---|
|  | Density ($g/cm^3$) | Thickness ($\mu m$) | Density ($g/cm^3$) | Thickness ($\mu m$) |  |
| Example 9 | 0.919 | 15 | 0.949 | 30 | 2 |
| Example 10 | 0.919 | 15 | 0.949 | 30 | 2 |
| Comparative Example 1 | — | — | 0.949 | 30 | — |
| Comparative Example 2 | 0.949 | 15 | 0.949 | 30 | 2 |
| Comparative Example 3 | 0.919 | 15 | 0.919 | 30 | 2 |
| Comparative Example 4 | 0.949 | 15 | 0.919 | 30 | 2 |

<Production of Thermal Transfer Ink Sheet>

A polyethylene terephthalate film with a thickness of 4.5 μm subjected to adhesion-enhancing treatment was used as a substrate sheet, an application liquid for a heat-resistant slipping layer having the following composition was applied onto the film so that the dried liquid was 0.8 g/m², to form a heat-resistant slipping layer.

(Composition of Application Liquid 1 for Heat-Resistant Slipping Layer)

Polyvinyl acetal (trade name: S-LEC KS-1, manufactured by SEKISUI CHEMICAL CO., LTD.) 60.6 parts by mass Polyisocyanate (trade name: BURNOCK D750, manufactured by Dainippon Ink And Chemicals, Inc.) 8.4 parts by mass Silicone resin fine particles (trade name: TOSPEARL 240, manufactured by Momentive Performance Materials Japan LLC, average particle diameter of 4 μm, polygonal) 1 part by mass Zinc stearyl phosphate (LBT-1830 purified, manufactured by Sakai Chemical Industry Co., Ltd.) 10 parts by mass Zinc stearate (SZ-PF, manufactured by Sakai Chemical Industry Co., Ltd.) 10 parts by mass Polyethylene wax (POLYWAX 3000, manufactured by Toyo Petrolite Co., Ltd.) 3 parts by mass Ethoxylated alcohol-modified wax (trade name: UNITOX 750, manufactured by TOYO ADL CORPORATION) 7 parts by mass Methyl ethyl ketone 200 parts by mass Toluene 100 parts by mass Then, an application liquid for a primer layer having the following composition is applied to a part of the side of the substrate opposite to the side on which the heat-resistant slipping layer was disposed, so that the dry application amount of the liquid was 0.10 g/m², and the liquid was dried to form a primer layer. Subsequently, an application liquid for a yellow color material layer, an application liquid for a magenta color material layer, and an application liquid for a cyan color material layer having the following compositions were repeatedly plane-sequentially applied in the order mentioned onto the primer layer so that the dried liquids were 0.6 g/m², and the liquids were dried to form a yellow color material layer, a magenta color material layer, and a cyan color material layer.

(Application Liquid for Primer Layer)

Polyvinyl pyrrolidone resin (trade name: K-90, manufactured by ISP Corporation) 3 parts by mass Alumina sol (average primary particle diameter of 10×100 nm, solid content of 10%, trade name: ALUMINA SOL 200, manufactured by Nissan Chemical Industries, Ltd.) 30 parts by mass Water 50 parts by mass IPA (isopropyl alcohol) 17 parts by mass (Composition for Application Liquid for Yellow Color Material Layer)

Disperse dye (Disperse Yellow 201) 2.5 parts by mass

Disperse dye (yellow dye represented by the following chemical formula) 2.5 parts by mass Binder resin (polyvinyl acetal resin, KS-5, manufactured by SEKISUI CHEMICAL CO., LTD.) 4.5 parts by mass Polyethylene wax 0.1 part by mass Methyl ethyl ketone 45.0 parts by mass Toluene 45.0 parts by mass (Composition of Application Liquid for Magenta Color Material Layer)

Dye represented by the following chemical formula 2.0 parts by mass

Binder resin (polyvinyl acetal resin, KS-5, manufactured by SEKISUI CHEMICAL CO., LTD.) 4.5 parts by mass Alkyl-modified silicone oil (KF-412, manufactured by Shin-Etsu Silicone Co., Ltd.) 0.1 part by mass Polyethylene wax 0.1 part by mass Methyl ethyl ketone 45.0 parts by mass Toluene 45.0 parts by mass (Composition of Application Liquid for Cyan Color Material Layer)

Dye represented by the following chemical formula 2.0 parts by mass

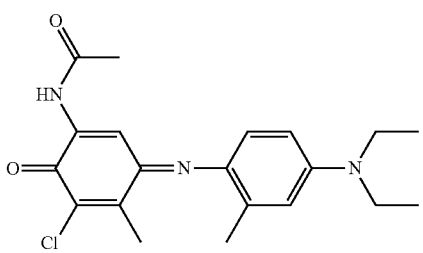 [SMILES: CCN(CC)c1ccc(N=C2C=C(NC(C)=O)C(=O)C(Cl)=C2C)c(C)c1]

Binder resin (polyvinyl acetal resin, KS-5, manufactured by SEKISUI CHEMICAL CO., LTD.) 4.5 parts by mass Alkyl-modified silicone oil (KF-412, manufactured by Shin-Etsu Silicone Co., Ltd.) 0.1 part by mass Polyethylene wax 0.1 part by mass Methyl ethyl ketone 45.0 parts by mass Toluene 45.0 parts by mass An application liquid for a protecting layer having the following composition was applied to another part of the side other than the side on which the heat-resistant slipping layer of the substrate sheet so that the dried liquid was 1.5 g/m$^2$, and the liquid was dried and formed. As a result, the thermal transfer ink sheet in which the heat-resistant slipping layer was disposed on the one side of the substrate, the primer layer and the thermal transfer color material layers (Y, M, and C) were layered on the part of the other side of the substrate in the order mentioned, and the protecting layer was disposed on the other part of the other side of the substrate was obtained.

(Composition of Application Liquid for Protecting Layer)

Acrylic resin (trade name: DIANAL BR-83, manufactured by Mitsubishi Rayon Co., Ltd.) 69.6 parts by mass Acrylic copolymer to which reactive ultraviolet absorbing agent reaction-binds (trade name: UVA 635L, manufactured by BASF Japan Ltd.) 17.4 parts by mass Silica (trade name: SYLYSIA 310, manufactured by Fuji Silysia Chemical Ltd.) 25 parts by mass Methyl ethyl ketone 100 parts by mass Toluene 100 parts by mass <Evaluation of Thermal Transfer Image-Receiving Sheet>

The (1) stability against curl and (2) texture of each of the thermal transfer image-receiving sheets produced in the Examples and Comparative Examples described above were evaluated.

(1) Stability against Curl

Black solid patterns were printed using the thermal transfer image-receiving sheets produced in the Examples and Comparative Examples described above, the thermal transfer ink sheets produced as described above, and a sublimation thermal transfer printer (model: MEGAPIXEL III, manufactured by ALTECH ADS Co., Ltd.) under the environmental conditions of 40° C. and 90%, thereby obtaining prints. Each print with a printed surface facing upward was placed on a plane, distances from the plane to the curling portions of four corners in a vertical direction in the case of concave curl and distances from the plane to the projections of curling portions in the case of convex curl were measured, and the maximum value was subjected to four-grade evaluation in the following ranges. The case of the convex curl of the printed surface facing upward was indicated by "+", while the case of the concave curl was indicated by "−".

(Evaluation Criteria)

⊚: −2 mm or more and +2 mm or less

○: −4 mm or more and less than −2 mm, or more than +2 mm and +4 mm or less

Δ: −5 mm or more and less than −4 mm, or more than +4 mm and +5 mm or less

×: less than −6 mm or more than +6 mm (2) Texture

Images with a gray hue having a gradation value of 50/255 (highlight images) were printed using the thermal transfer image-receiving sheets produced in the Examples and Comparative Examples described above, the thermal transfer ink sheets produced as described above, and a sublimation thermal transfer printer (model: MEGAPIXEL III, manufactured by ALTECH ADS Co., Ltd.), and the textures thereof were evaluated by visual observation based on the following evaluation criteria.

(Evaluation Criteria)

○: A gray highlight image area was uniform, no dispersion of fibers of the paper core material of an undercoat was observed in a surface state, and smoothness, quality, and feeling equivalent to those of photographic paper reproducing full-color silver halide photography were achieved.

Δ: The texture of a surface of the non-coat paper substrate of an undercoat was partly observed in the surface state of a gray highlight image area, resulting in concern about the texture. Its smoothness, quality, and feeling were inferior to those of photographic paper reproducing full-color silver halide photography and were unsatisfactory. (A result intermediate between the evaluations of "Good" and "Poor"; unsatisfactory).

×: The dispersion of the fibers of the paper core material of an undercoat was observed in the surface state of a gray highlight image area, resulting in considerable concern about the texture. Its smoothness, quality, and feeling were inferior to those of photographic paper reproducing full-color silver halide photography.

The result of each of the evaluations described above is shown in Table 2. The thermal transfer image-receiving sheets of Examples satisfying the configuration of the present invention were found to have favorable stability against curl under the environmental conditions of high temperature and high humidity as well as excellent texture in comparison with the thermal transfer image-receiving sheets of Comparative Examples.

TABLE 2

| | Evaluation of Thermal Transfer Image-Receiving Sheet | |
|---|---|---|
| | (1) Stability against Curl | (2) Texture |
| Example 1 | ⊚ | ○ |
| Example 2 | ⊚ | ○ |
| Example 3 | ⊚ | ○ |
| Example 4 | ○ | ○ |
| Example 5 | ○ | Δ |
| Example 6 | ○ | ○ |
| Example 7 | ⊚ | ○ |
| Example 8 | ⊚ | ○ |
| Example 9 | ⊚ | ○ |
| Example 10 | ⊚ | ○ |
| Comparative Example 1 | X | X |
| Comparative Example 2 | Δ | ○ |
| Comparative Example 3 | Δ | ○ |
| Comparative Example 4 | X | ○ |

Reference Signs List

10 Thermal transfer image-receiving sheet
11 Substrate layer
12 First polyolefin resin layer
13 Porous layer
14 Primer layer
15 Color material-receiving layer
16 Second polyolefin resin layer
17 Support for thermal transfer image-receiving sheet

The invention claimed is:

1. A support for a thermal transfer image-receiving sheet for disposing a color material-receiving layer on a porous layer side of a substrate layer, comprising at least the porous layer composed of a porous film; a first polyolefin resin layer; the substrate layer; and a second polyolefin resin layer, that are layered in this order, wherein
the first polyolefin resin layer has a density of 0.93 $g/cm^3$ or less,
the second polyolefin resin layer has a density of more than 0.93 $g/cm^3$, and
the thickness of the second polyolefin resin layer is 1.5 times to 5 times the thickness of the first polyolefin resin layer.

2. The support for a thermal transfer image-receiving sheet according to claim 1, wherein the thickness of the second polyolefin resin layer is 1.5 times to 2.5 times the thickness of the first polyolefin resin layer.

3. The support for a thermal transfer image-receiving sheet according to claim 1, wherein at least one of the first polyolefin resin layer and the second polyolefin resin layer comprise polyethylene resin as a main component.

4. A thermal transfer image-receiving sheet obtained by layering a color material-receiving layer on the porous layer of the support for a thermal transfer image-receiving sheet according to claim 1.

5. The support for a thermal transfer image-receiving sheet according to claim 1, wherein the thickness of the first polyolefin resin layer is 5 μm to 20 μm.

6. The support for a thermal transfer image-receiving sheet according to claim 1, wherein the thickness of the second polyolefin resin layer is 15 μm to 35 μm.

7. The support for a thermal transfer image-receiving sheet according to claim 1, wherein the first polyolefin resin layer has a density of 0.915 $g/cm^3$ to 0.925 $g/cm^3$, and the second polyolefin resin layer has a density of 0.94 $g/cm^3$ to 0.96 $g/cm^3$.

8. The support for a thermal transfer image-receiving sheet according to claim 1, wherein the porous film contains a polyolefin resin as a resin as a base, and of which the interior contains fine voids.

9. A method for producing a support for a thermal transfer image-receiving sheet for disposing a color material-receiving layer on a porous layer side of a substrate layer, comprising:
extruding a second polyolefin resin having a density of more than 0.93 $g/cm^3$ to form a second polyolefin resin layer on one side of a substrate layer by an extrusion lamination method; and
laminating a porous layer composed of a porous film and the substrate layer by a first polyolefin resin layer formed by extruding a first polyolefin resin having a density of 0.93 $g/cm^3$ or less on the side of the substrate layer opposite to the second polyolefin resin layer by an extrusion lamination method.

10. The method for producing a thermal transfer image-receiving sheet according to claim 9, further comprising:
layering a color material-receiving layer on the porous layer prior to the step of laminating the porous layer and the substrate layer.

11. A method for producing a support for a thermal transfer image-receiving sheet for disposing a color material-receiving layer on a porous layer side of a substrate layer, comprising:
laminating a porous layer composed of a porous film and a substrate layer by a first polyolefin resin layer formed by extruding a first polyolefin resin having a density of 0.93 $g/cm^3$ or less on one side of the substrate layer by an extrusion lamination method; and
extruding a second polyolefin resin having a density of more than 0.93 $g/cm^3$ to form a second polyolefin resin layer on the side of the substrate layer opposite to the first polyolefin resin layer by an extrusion lamination method.

* * * * *